United States Patent
Evans et al.

(10) Patent No.: US 9,262,470 B1
(45) Date of Patent: Feb. 16, 2016

(54) APPLICATION RECOMMENDATIONS BASED ON APPLICATION AND LIFESTYLE FINGERPRINTING

(71) Applicant: Amazon Technologies, Inc., Reno, NV (US)

(72) Inventors: Ethan Zane Evans, Snoqualmie, WA (US); David Allen Markley, Bellevue, WA (US); James Newton Adkins, III, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 13/926,574

(22) Filed: Jun. 25, 2013

(51) Int. Cl.
*G06F 17/30* (2006.01)

(52) U.S. Cl.
CPC ...... *G06F 17/30386* (2013.01); *G06F 17/3084* (2013.01); *G06F 17/3097* (2013.01)

(58) Field of Classification Search
USPC .......................................... 707/736, 749, 767
See application file for complete search history.

(56) References Cited

U.S. PATENT DOCUMENTS

| | | | | |
|---|---|---|---|---|
| 8,396,759 | B2* | 3/2013 | Mehta | G06Q 30/0282 455/456.3 |
| 8,452,797 | B1* | 5/2013 | Paleja | G06Q 30/02 707/767 |
| 8,478,747 | B2* | 7/2013 | Jeong | G06F 17/3087 707/723 |
| 8,612,470 | B1* | 12/2013 | Fushman | G06F 17/30174 707/749 |
| 8,953,199 | B2* | 2/2015 | Kumarahalli Srinivasmurthy et al. | G06F 3/1204 358/1.15 |
| 8,990,353 | B2* | 3/2015 | Repasi | H04L 12/6418 709/219 |
| 9,058,612 | B2* | 6/2015 | Ben-Itzhak | G06Q 30/02 |
| 2008/0250323 | A1* | 10/2008 | Huff | 715/733 |
| 2010/0211863 | A1* | 8/2010 | Jones et al. | 715/224 |
| 2011/0184899 | A1* | 7/2011 | Gadanho et al. | 706/46 |
| 2011/0307354 | A1* | 12/2011 | Erman et al. | 705/27.1 |
| 2013/0159134 | A1* | 6/2013 | Chervirala et al. | 705/26.7 |
| 2013/0196615 | A1* | 8/2013 | Zalmanovitch et al. | 455/405 |

OTHER PUBLICATIONS

U.S. Appl. No. 13/926,211, filed Jun. 25, 2013 and entitled "Analyzing Security of Applications".
U.S. Appl. No. 13/926,234, filed Jun. 25, 2013 and entitled "Recommending Improvements to and Detecting Defects Within Applications".
U.S. Appl. No. 13/926,607, filed Jun. 25, 2013 and entitled "Application Fingerprinting".
U.S. Appl. No. 13/926,656, filed Jun. 25, 2013 and entitled "Application Monetization Based on Application and Lifestyle Fingerprinting".

(Continued)

*Primary Examiner* — Cam-Linh Nguyen
(74) *Attorney, Agent, or Firm* — Thomas | Horstemeyer, LLP (57) ABSTRACT

Disclosed are various embodiments that employ application fingerprinting and lifestyle fingerprinting. Application fingerprints are received, where each application fingerprints is associated with a corresponding application and is generated based at least in part on a static analysis, a dynamic analysis, and a behavioral analysis of the corresponding application. A selection of an application is received. Applications that are similar to the selected application are determined by comparing a particular application fingerprint that is associated with the selected application with other application fingerprints. Users are determined based at least in part on lifestyle fingerprints. In one embodiment, such users may be invited to test the selected application.

20 Claims, 7 Drawing Sheets

(56) References Cited

OTHER PUBLICATIONS

U.S. Appl. No. 13/926,683, filed Jun. 25, 2013 and entitled "Developing Versions of Applications Based on Application Fingerprinting".

U.S. Appl. No. 13/926,215, filed Jun. 25, 2013 and entitled "Identifying Relationships Between Applications".

U.S. Appl. No. 13/215,972, filed Aug. 23, 2011 and entitled "Collecting Application Usage Metrics".

U.S. Appl. No. 13/555,724, filed Jul. 23, 2012 and entitled "Behavior Based Identity System".

* cited by examiner

APPLICATION RECOMMENDATIONS BASED ON APPLICATION AND LIFESTYLE FINGERPRINTING

BACKGROUND

An application marketplace may offer a multitude of different applications, such as mobile applications. For example, the applications may include games, email applications, social networking applications, mapping applications, imaging applications, music playing applications, shopping applications, and so on. Various applications may use different hardware features and may employ different software libraries. Different users may prefer to use different types of applications.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating profiles of applications, referred to herein as application fingerprinting, and generating profiles of users, referred to herein as lifestyle fingerprinting. Specifically, the present disclosure focuses on the intersection between application fingerprinting and lifestyle fingerprinting. An application fingerprint uniquely identifies an application based on, for example, what application programming interfaces (API) it uses, what software libraries it uses, individual code fragments usage by the application, what hardware devices it accesses, typical resource consumption patterns, and/or other characteristics. In some embodiments, the application fingerprint may also identify typical user behavior relative to the application. The application fingerprints may have many uses, including application search, application categorization, defect detection, and so on.

Lifestyle fingerprints may incorporate various information explicitly provided by users or inferred about users from their actions. In one embodiment, this information may include a listing of applications downloaded, and for each application downloaded, a profile of the usage of the application. For example, if a user downloads an application and uses only one time, this may be an indication that the user did not like the application. Suppose that a user downloads twenty applications in the same space (e.g., money management applications or another category). Suppose further that the user runs nineteen of the applications once and then exits or deletes the applications, but runs the other one of the applications repeatedly. Accordingly, the application fingerprints of each of the twenty applications can be used in combination with this usage data as an indicator of the features that the user seeks in applications.

Continuing this example, it may be determined that the application fingerprint of the application that is repeatedly used includes information indicative of a feature, a usage profile, a code fragment, a color palette, a software library, a sound schema, the usage or non-usage of a peripheral device, a configuration, whether the application is adapted for a particular device or operating system, connectivity, privacy features, a particular vendor or vendor type, a rating, a price point, a purchasing profile, any other attribute or any combination of the aforementioned attributes. As such, it may be determined that the user has a preference for one or more attributes. This information can be used in any number of ways to recommend other applications to the user, or to recommend that developers of applications modify their applications in one or more ways to appeal to a broader audience or to a specific target audience. The above is a general example which, as described herein, can be improved upon to accurately reflect the lifestyle fingerprint of the user. For example, a determination similar to that above can be made for each type of application, times of the day, locations, days of the week, or in relationship to any other aspect of a user lifestyle and usage of a device.

In another example, lifestyle fingerprints may be used to provide information to developers about the lifestyle usage metrics around their application. To this end, the lifestyle fingerprints of the users of an application may be analyzed to determine their common characteristics. The common characteristics may then be leveraged by the developer to better monetize the application. For example, it may be determined that the users of the application prefer extended trial periods before purchasing applications. Accordingly, it may be recommended to the developer to extend a trial period for the application. This monetization-related information may be augmented through application fingerprinting to determine lifestyle fingerprints of likely users as well as actual users. Incorporating the lifestyle fingerprints of likely users increases the data set and may improve the developer recommendations.

In still another example, lifestyle fingerprints may be employed to recommend an application upgrade to a user. For example, lifestyle fingerprints may indicate that users who are similar to a particular user often purchase a certain type of application upgrade. Similarly, lifestyle fingerprints may be used to provide an in-application item to a user. For example, lifestyle fingerprints may indicate that users who are similar to a particular user are likely to buy a type of in-application item if another type of in-application item is provided for free.

In still another example, lifestyle fingerprints may be used to target advertising to specific users. To illustrate, the users of a particular application may be determined, and the lifestyle fingerprints corresponding to these users may be retrieved.

These lifestyle fingerprints may be correlated with the lifestyle fingerprints of other people who are not users of the particular application. In other words, the non-users may have lifestyle fingerprints similar to those of the users. Advertising for the particular application may then be targeted to the non-users having the similar lifestyle fingerprints as the users.

Various techniques relating to application fingerprinting are described in U.S. Patent Application entitled "APPLICATION FINGERPRINTING" filed Jun. 25, 2013 under Ser. No. 13/926,607; U.S. Patent Application entitled "APPLICATION MONETIZATION BASED ON APPLICATION AND LIFESTYLE FINGERPRINTING" filed Jun. 25, 2013 under Ser. No. 13/926,656; U.S. Patent Application entitled "DEVELOPING VERSIONS OF APPLICATIONS BASED ON APPLICATION FINGERPRINTING" filed Jun. 25, 2013 under Ser. No. 13/926,683; U.S. Patent Application entitled "IDENTIFYING RELATIONSHIPS BETWEEN APPLICATIONS" filed Jun. 25, 2013 under Ser. No. 13/926, 215; U.S. Patent Application entitled "RECOMMENDING IMPROVEMENTS TO AND DETECTING DEFECTS WITHIN APPLICATIONS" filed Jun. 25, 2013 under Ser. No. 13/926,234; and U.S. Patent Application entitled "ANALYZING SECURITY OF APPLICATIONS" filed Jun. 25, 2013 under Ser. No. 13/926,211; all of which are incorporated herein by reference in their entirety.

Figure 1A:
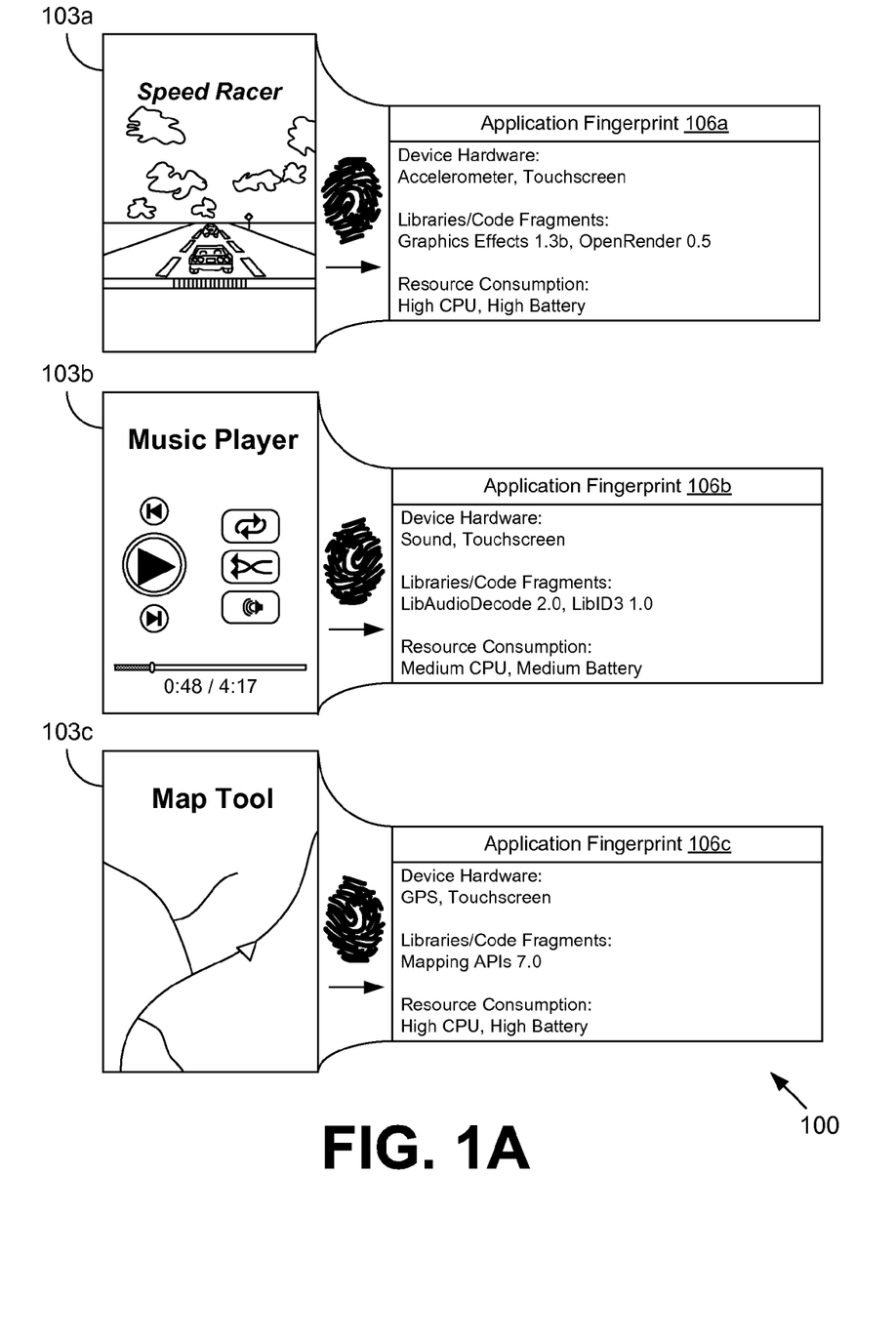
FIG. 1A is a drawing of an exemplary application fingerprint scenario according to various embodiments of the present disclosure.

With reference to FIG. 1A, illustrated is an exemplary application fingerprint scenario 100. The exemplary application fingerprint scenario 100 involves three applications 103a, 103b, and 103c, for which corresponding application fingerprints 106a, 106b, and 106c have been generated. The exemplary applications 103 are representative of the multitude of applications 103 that may be offered by an application marketplace. In this non-limiting example, the application 103a corresponds to a game, the application 103b corresponds to a music player, and the application 103c corresponds to a mapping application. Each of the applications 103 has its own respective application fingerprint 106 that can function to distinguish one application 103 from another and/or to identify similarities between applications 103.

In the non-limiting example of FIG. 1A, each of the application fingerprints 106 identifies characteristics relating to device hardware used, software libraries used, and resource consumption. In other examples, additional or different characteristics may be represented by the application fingerprints 106 such as usage or behavioral metrics associated with use of the application by users. Here, the application fingerprint 106a indicates that the application 103a uses the accelerometer and touchscreen of the device and the software libraries or code fragments named "Graphics Effects 1.3b" and "OpenRender 0.5." Also, the application 103a is associated with high processor and battery usage. The application fingerprint 106b indicates that the application 103b uses a sound device and the touchscreen of the device and the software libraries or code fragments named "LibAudioDecode 2.0" and "LibID3 1.0." The application 103b is associated with medium processor and battery usage. The application fingerprint 106c indicates that the application 103c uses a global positioning system (GPS) device and a touchscreen, while using the software library named "Mapping APIs 7.0." The application 103c is associated with high processor and battery usage.

Figure 1B:
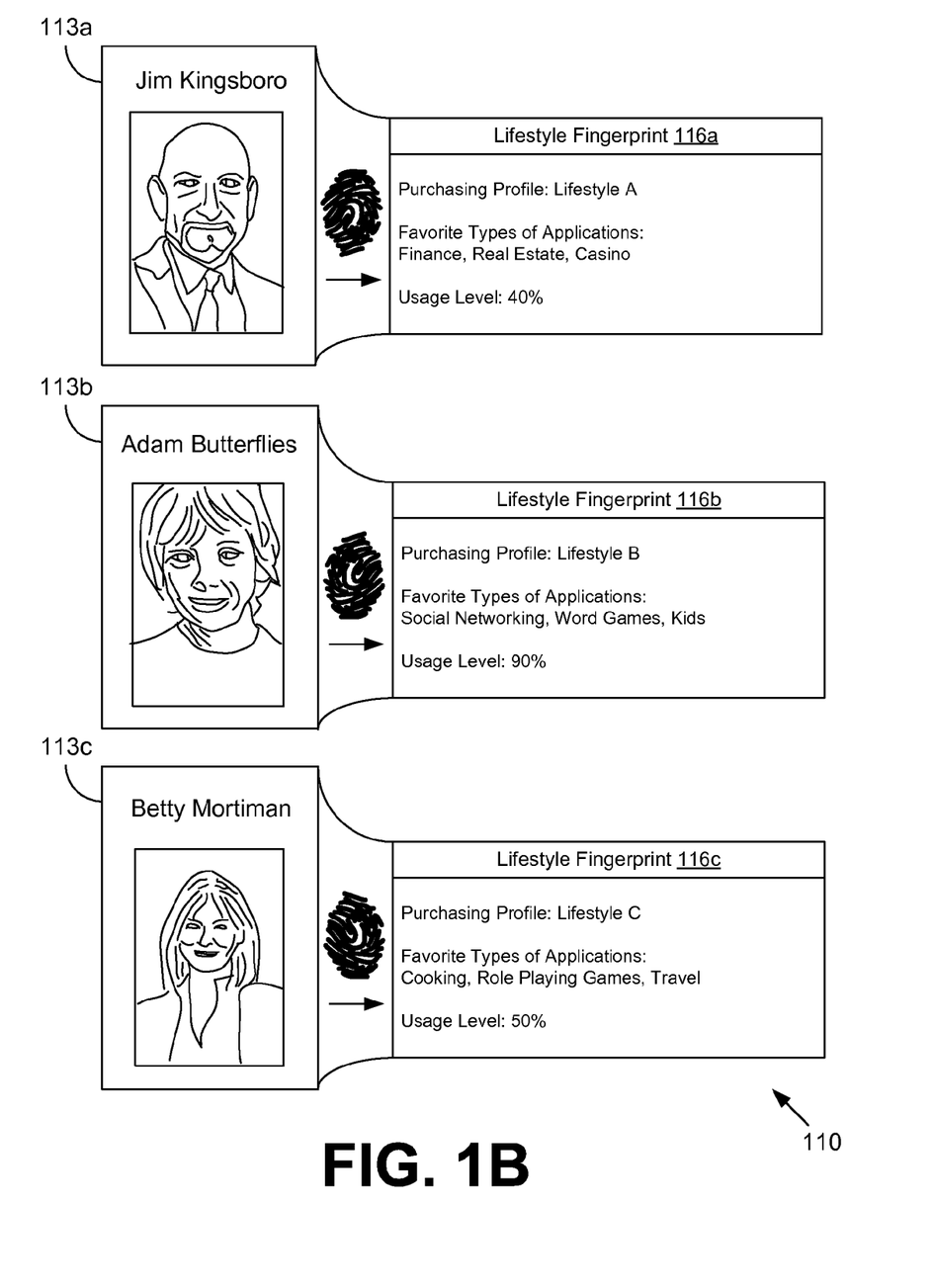
FIG. 1B is a drawing of an exemplary lifestyle fingerprint scenario according to various embodiments of the present disclosure.

Turning to FIG. 1B, illustrated is an exemplary lifestyle fingerprint scenario 110. The exemplary lifestyle fingerprint scenario 110 involves three users 113a, 113b, and 113c, for which corresponding lifestyle fingerprints 116a, 116b, and 116c have been generated. Each lifestyle fingerprint 116 includes various profiling information regarding the corresponding user 113. In this non-limiting example, the lifestyle fingerprint 116 includes information provided by a user which may include one or more of a purchasing profile, favorite types of applications 103 (FIG. 1A), and a usage level for the corresponding user 113.

Here, the lifestyle fingerprint 116a indicates that the user 113a "Jim Kingsboro" has a purchasing profile of "lifestyle A." For example, the user 113a may frequently purchase applications 103 without regard to price. The favorite types of applications 103 for the user 113a are finance, real estate, and casino applications 103. Such categories of applications 103 may be discovered through analyzing the application fingerprints 106 (FIG. 1A) of applications 103 purchased and used by the user 113. The user 113a is indicated as having a usage level of 40%, which may correspond, for example, to a relative frequency of application 103 usage.

The lifestyle fingerprint 116b indicates that the user 113b "Adam Butterflies" has a purchasing profile of "lifestyle B." For example, the user 113b may be reluctant to make purchases of applications 103 or may prefer to purchase relatively lower priced applications 103. The favorite types of applications 103 for the user 113b are social networking, word games, and kids' applications 103. The user 113b is indicated as having a usage level of 90%. The lifestyle fingerprint 116c indicates that the user 113c "Betty Mortiman" has a purchasing profile of "lifestyle C." For example, the user 113c may often make purchases from merchandizing occurring within an application 103 to unlock additional functionality, extend use, obtain virtual currency, obtain related applications 103, or make other purchases. The favorite types of applications 103 for the user 113b are social networking, word games, and kids' applications 103. The user 113b is indicated as having a usage level of 90%. In the following discussion, a general description of the system and its components is provided, followed by a discussion of the operation of the same.

Figure 2:
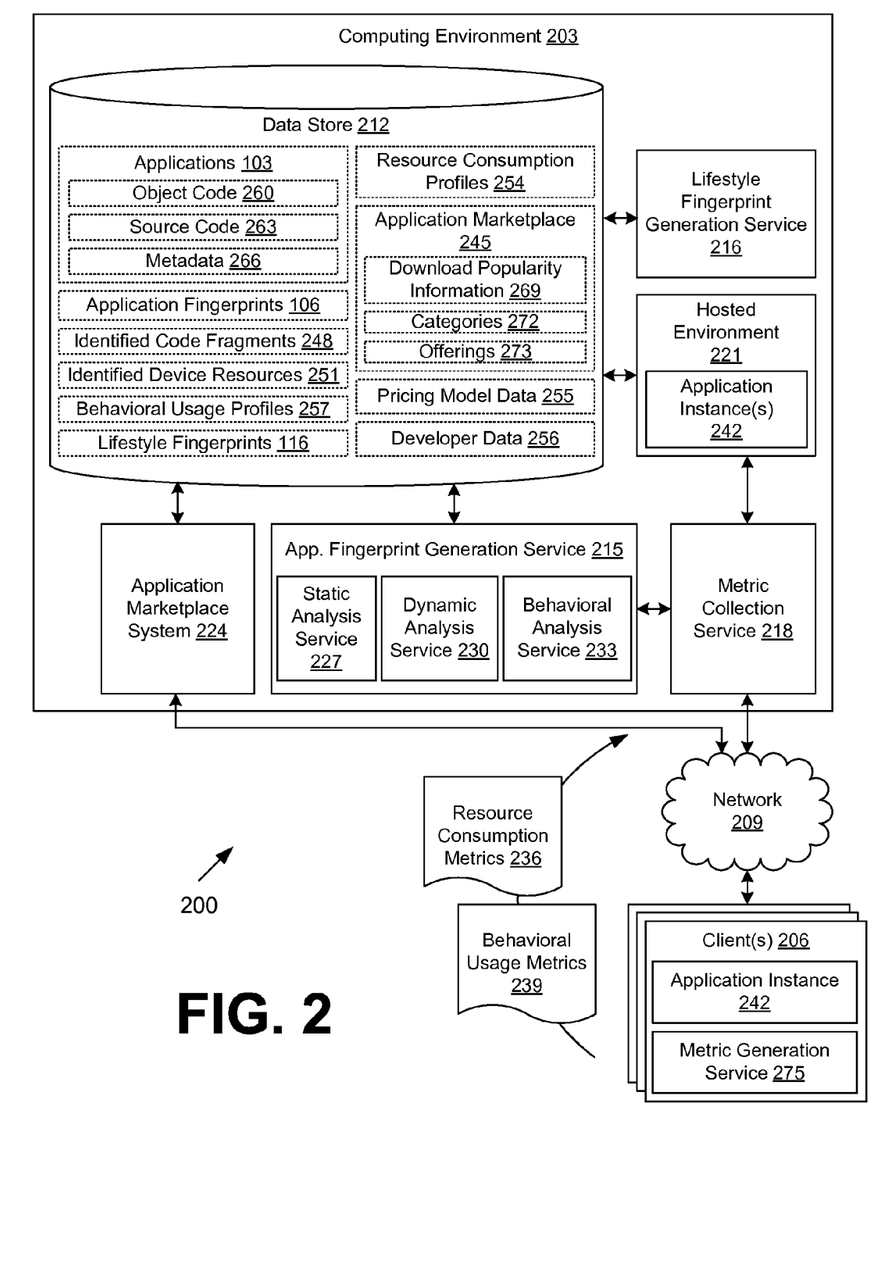
FIG. 2 is a drawing of a networked environment according to various embodiments of the present disclosure.

Turning now to FIG. 2, shown is a networked environment 200 according to various embodiments. The networked environment 200 includes a computing environment 203 and one or more clients 206 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an application fingerprint generation service 215, a lifestyle fingerprint generation service 216, a metric collection service 218, a hosted environment 221, an application marketplace system 224, and other applications, services, processes, systems, engines, or functionality not discussed in detail herein. The application fingerprint generation service 215 is executed to generate application fingerprints 106 for applications 103 as will be described. To this end, the application fingerprint generation service 215 may include a static analysis service 227, a dynamic analysis service 230, and a behavioral analysis service 233 for performing static analysis, dynamic analysis, and behavioral analysis on the application 103. The results of the analyses may be incorporated in the resulting application fingerprint 106.

The lifestyle fingerprint generation service 216 is executed to generate lifestyle fingerprints 116 for users of the application marketplace system 224. The lifestyle fingerprints 116 includes various information regarding the users such as information indicative of purchasing profiles, applications 103 of interest, time periods for using applications 103, frequency of using applications 103, types of clients 206 employed for using the applications 103, demographic data, geographic data, and/or other information. The lifestyle fingerprint generation service 216 may be configured to generate portions of the lifestyle fingerprints 116 based at least in part on application fingerprints 106. As a non-limiting example, the lifestyle fingerprints 116 may include information indicative of software libraries frequently used by the user, where the software libraries are identified from the application fingerprints 106 of the applications 103 used by the user.

In various embodiments, the lifestyle fingerprint generation service 216 may access various information that has been provided, implicitly or explicitly, by a user. The lifestyle fingerprint generation service 216 may then analyze this information to extract traits or characteristics that provide a lifestyle profile of the user. As a non-limiting example, such traits or characteristics may reveal that a certain user is a likely in-application purchaser or would likely purchase an application if a free upgrade were offered. As a non-limiting example, such traits or characteristics may reveal a preference for certain categories of applications or a distinctive usage patterns for each of certain categories of applications. Indications of such traits or characteristics may then be summarized within a lifestyle fingerprint 116 for the user.

The metric collection service 218 is executed to obtain various metrics for use by the application fingerprint generation service 215 in generating application fingerprints 106. Such metrics may include resource consumption metrics 236, behavioral usage metrics 239, and/or other types of metrics. The hosted environment 221 is configured to execute an application instance 242 for use in dynamic analysis and resource consumption profiling by the application fingerprint generation service 215. To this end, the hosted environment 221 may comprise an emulator or other virtualized environment for executing the application instance 242.

The application marketplace system 224 is executed to provide functionality relating to an application marketplace 245, where a multitude of applications 103 may be submitted by developers and made available for purchase and/or download. The application marketplace system 224 may include functionality relating to electronic commerce, e.g., shopping cart, ordering, and payment systems. The application marketplace system 224 may support searching and categorization functionality so that users may easily locate applications 103 that are of interest. The application marketplace system 224 may include functionality relating to verification of compatibility of applications 103 with various clients 206.

The data stored in the data store 212 includes, for example, applications 103, application fingerprints 106, identified code fragments 248, identified device resources 251, resource consumption profiles 254, pricing model data 255, data 256, behavioral usage profiles 257, lifestyle fingerprints 116, data relating to an application marketplace 245, and potentially other data. The applications 103 correspond to those applications 103 that have been submitted by developers and/or others, for example, for inclusion in the application marketplace 245. The applications 103 may correspond to game applications, email applications, social network applications, mapping applications, and/or any other type of application 103. In one embodiment, the applications 103 correspond to mobile applications 103 for use on mobile devices such as, for example, smartphones, tablets, electronic book readers, and/or other devices.

Each application 103 may include, for example, object code 260, source code 263, metadata 266, and/or other data. The object code 260 corresponds to code that is executable by clients 206, either natively by a processor or by way of a virtual machine executed by the processor. The source code 263 corresponds to the source for the application 103 as written in a programming language. In some cases, the source code 263 may be generated by way of decompiling the object code 260. The source code 263 may be executable by clients 206 through the use of an interpreter. The metadata 266 may declare compatibility with various clients 206, software libraries used by the application 103, device resources used by the application 103, and/or other information. In one embodiment, an application 103 is distributed as a "package" including the object code 260 and the metadata 266. In some cases, the metadata 266 may include documentation such as unified modeling language (UML), Javadoc documentation, and/or other forms of documentation for the application 103.

The application fingerprints 106 each identify a respective application 103 by its characteristics. In one embodiment, an application fingerprint 106 corresponds to a summarized numerical value. In various embodiments, the application fingerprint 106 may be stored as a string. The application fingerprint 106 may include various unique identifiers for device resources, code fragments, graphical assets used by the application 103, files accessed by the application 103, and/or characteristics of the application 103. The application fingerprint 106 may indicate resource consumption profiles 254 and/or behavioral usage profiles 257.

The identified code fragments 248 correspond to various code libraries and application programming interface (API) calls that are used by various applications 103. Unlike custom code that is specific to an application 103, the identified code fragments 248 include functionality that may be employed and reused by many different applications 103 in either an exact or substantially similar form. As an example, a code fragment 248 may correspond to a software library. As another example, a code fragment 248 may correspond to open-source reference code for performing some function. Each of the identified code fragments 248 may have a corresponding version, and multiple different versions of the software library may be employed by the applications 103. Unique identifiers may be associated with each identified code fragment 248 and/or various API calls within each identified code fragment 248. Various data may be stored indicating how the various code fragments 248 are employed, e.g., to render specific user interface elements, to obtain a specific user gesture, and so on.

The identified device resources 251 correspond to the various hardware and/or software requirements of the applications 103. For example, various applications 103 may require or request access to hardware devices on clients 206 such as accelerometers, touchscreens having a certain resolution/size, GPS devices, network devices, storage devices, and so on. Additionally, various applications 103 may access application resources on clients 206. Such application resources may include sound files, graphical assets, graphical textures, images, buttons, user interface layouts, and so on. Such application resources may include data items on clients 206, e.g., contact lists, text messages, browsing history, etc. Identifiers for such application resources may be included in a generated application fingerprint 106. It is noted that the identified device resources 251 may include static resources and runtime resources.

The resource consumption profiles 254 correspond to profiles of resource consumption for applications 103 that are generated from resource consumption metrics 236 collected by the metric collection service 218. The resource consumption profiles 254 may indicate processor usage, memory usage, battery usage, network usage, and/or other resources that are consumed. The resource consumption profiles 254 may indicate maximum consumption, average consumption, median consumption, minimum consumption, and/or other statistics for a particular application 103.

The pricing model data 255 defines various pricing models that may be employed by the applications 103 offered in the application marketplace 245. For example, the pricing model data 255 may define pricing models that are purely purchase based, purely advertising supported, partially purchase based and partially advertising supported, pay per use, pay for time, in-application purchase supported, and so on. The developer data 256 may define various information regarding characteristics of the developers of the applications 103. Such characteristics may include, for example, longevity, quantity of applications 103, quality of applications 103, user ratings, popularity of applications 103, and other characteristics.

The behavioral usage profiles 257 correspond to profiles of behavioral usage for applications 103 that are generated from behavioral usage metrics 239 collected by the metric collection service 218. The behavioral usage profiles 257 may indicate average duration that the application instances 242 execute, times of day and/or locations where the application instances 242 are executed, privacy-related behaviors of the application instances 242 (e.g., whether contact lists are accessed, whether browsing history is accessed, and so forth), circumstances under which the application instances 242 crash (e.g., types of clients 206, types of wireless carriers, etc.), user demographics, and so on. The behavioral usage profiles 257 may incorporate synchronization history from a synchronization service. Metrics related to synchronization may be obtained from the client 206 and/or from the synchronization service.

The lifestyle fingerprints 116, as discussed in connection with FIG. 1B, include data profiling various characteristics of particular users of the applications 103 based, for example, on data that the particular users have elected to share. In one embodiment, the lifestyle fingerprints 116 may record time periods (e.g., hours of the day, days of the week, etc.) during which the particular user typically uses certain types of applications 103. The lifestyle fingerprints 116 may also record locations where the user typically users certain types of applications 103. As a non-limiting example, a user may employ a certain type of application 103 while at the office weekdays from 8 a.m. to 5 p.m., another type of application 103 while commuting weekdays from 7:30 a.m. to 8 a.m. and 5 p.m. to 5:30 p.m., and yet another type of application 103 while at home on weekdays from 5:30 p.m. to 8 p.m. and on weekends. To this end, the lifestyle fingerprints 116 may be developed based at least in part on the behavioral usage metrics 239 received from clients 206 associated with the particular users.

As another non-limiting example, the lifestyle fingerprints 116 may record whether a user frequently taps on a touchscreen of the client 206 or engages in any other characteristic repetitive behavior. Such characteristic behaviors may be correlated with a purchasing profile. For instance, frequent screen-tappers may also favor advertising supported applications 103.

Beyond merely the types of applications 103 that are preferred, the lifestyle fingerprints 116 may also record specific components or libraries of applications 103 that are frequently used. Such a determination may be made through comparison with the application fingerprints 106. For example, a user may prefer applications 103 that use social networking functionality, global positioning system (GPS) functionality, or a flashlight functionality.

Additionally, the lifestyle fingerprints 116 may also profile user-specific purchasing behavior via the application marketplace system 224. For example, a lifestyle fingerprint 116 for a given user may indicate whether the user is a frequent purchaser regardless of cost, a reluctant cost-conscious purchaser, or a frequent purchaser from within an application 103. This information may be employed by the application marketplace system 224 to target specific versions of applications 103 (e.g., low-cost versions, high-cost versions, "freemium" versions, etc.) and to market effectively to specific categories of users. The lifestyle fingerprint 116 may also include information indicative of the response of a user to a particular application 103 or class of applications 103, for example, whether the user downloaded the application 103 and did nothing further with it, whether the user purchased the application 103 within a shorter predefined time period, or whether the user purchased the application 103 within a longer predefined time period.

Other user lifestyle aspects that may be incorporated in lifestyle fingerprint 116 may include, for example, a typical amount of time spent browsing an application marketplace 245 before making a download or purchase, the typical amount spent in the application marketplace 245, how many applications 103 are downloaded but used only once and then deleted, the average number of times an application 103 is used before it is deleted, the average length of usage sessions, the propensity to leave an application 103 on a device but never use it, sound volume settings of the device when an application 103 is executing, and other aspects.

Various techniques relating to collecting behavioral usage metrics 239 from applications 103 are described in U.S. patent application Ser. No. 13/215,972 entitled "COLLECTING APPLICATION USAGE METRICS" and filed on Aug. 23, 2011, which is incorporated herein by reference in its entirety. Various techniques relating to profiling user behavior are described in U.S. patent application Ser. No. 13/555,724 entitled "BEHAVIOR BASED IDENTITY SYSTEM" and filed on Jul. 23, 2012, which is incorporated herein by reference in its entirety.

The data associated with the application marketplace 245 includes, for example, download popularity information 269, categories 272, offerings 273, and/or other data. The download popularity information 269 indicates the popularity, either in terms of absolute number of downloads or in terms of relative popularity, of the applications 103 offered by the application marketplace 245. The categories 272 correspond to groupings of applications 103 that may indicate similar applications 103 and may be employed by users to more easily navigate the offerings of the application marketplace 245. Non-limiting examples of categories 272 may include social networking applications 103, mapping applications 103, movie information applications 103, shopping applications 103, music recognition applications 103, and so on. The offerings 273 may define differing versions and/or pricing models that may be offered in the application marketplace 245 for various users. In some embodiments, a particular offering 273 of an application 103 may be offered to a first user but not a second user based at least in part on lifestyle fingerprints 116 and/or other data. In one embodiment, a single application 103 may have multiple monetization versions (e.g., "freemium," advertising supported, paid subscription based, etc.) each corresponding to an offering 273. The monetization versions may be enabled or disabled depending, for example, on the offering 273 and/or the specific user.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display comprising, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as an application instance 242, a metric generation service 275, and/or other applications. The application instance 242 corresponds to an instance of an application 103 that has been downloaded to the client 206 from the application marketplace system 224. The application instance 242 may correspond to actual use by an end user or test use on a test client 206. The metric generation service 275 is configured to monitor the application instance 242 and report data that the user of the client 206 has elected to share with the metric collection service 218. Such data may include resource consumption metrics 236, behavioral usage metrics 239, and/or other data. The client 206 may be configured to execute applications beyond the application instance 242 and the metric generation service 275 such as, for example, browsers, mobile applications, email applications, social networking applications, and/or other applications.

Next, a general description of the operation of the various components of the networked environment 200 is provided. To begin, an application 103 is received by the computing environment 203. The application fingerprint generation service 215 then begins processing the application 103 to generate an application fingerprint 106. Such initial processing may comprise a static analysis performed by the static analysis service 227.

To this end, the static analysis service 227 may compare the object code 260 and/or the source code 263 against identified code fragments 248. In one embodiment, this comparison may involve pattern matching against portions of the object code 260 and/or source code 263. In some cases, the object code 260 may be decompiled into source code 263 upon which the pattern matching is performed. Additionally, the static analysis service 227 may determine which identified device resources 251 are accessed, required, and/or requested by the application 103 through examination of the object code 260, source code 263, and/or metadata 266.

The application fingerprint generation service 215 may also perform a dynamic analysis of the application 103 using the dynamic analysis service 230. The dynamic analysis may include executing an application instance 242 for the application 103 in a hosted environment 221 and determining which code paths are taken by the object code 260. This may indicate which of the identified code fragments 248 and/or identified device resources 251 are actually used by the application instance 242. Manual testing and/or automated testing of the application instance 242 may be performed in the hosted environment 221.

Meanwhile, resource consumption metrics 236 may be generated by the hosted environment 221 and sent to the metric collection service 218. Resource consumption metrics 236 may also be generated by a metric generation service 275 executed in a client 206. The resource consumption metrics 236 then may be reported back from the client 206 to the metric collection service 218 by way of the network 209. The dynamic analysis service 230 may then process the collected resource consumption metrics 236 to generate a resource consumption profile 254 for the application 103. The resource consumption profile 254 may, for example, indicate that an application 103 is processor intensive at a certain point in execution, that an application 103 appears to have a memory leak, that an application 103 uses up battery resources quickly, that an application 103 uses the display relatively frequently, and/or other patterns of resource consumption.

As testing users and potentially other users download the application 103, the application 103 may be installed on various clients 206, thereby allowing the behavioral analysis service 233 to process behavioral usage metrics 239 that reflect real-world use of the application 103 by users. The behavioral usage metrics 239 may be generated by the metric generation service 275 and sent to the metric collection service 218 by way of the network 209. The behavioral analysis service 233 may perform a behavioral analysis on the behavioral usage metrics 239 in order to generate a behavioral usage profile 257. The behavioral usage profile 257 may, for example, indicate locations of users when they use the application 103, duration of use for the application 103, times of day that the application 103 is used, close out points for the application 103 as determined by a synchronization service, and so on. The behavioral usage profile 257 may be indexed by user demographic data, which may include, for example, user language and country. Accordingly, different usage patterns may be ascertained in different countries, or where different languages are used.

The application fingerprint generation service 215 then uses the results of the static analysis, dynamic analysis, and/or behavioral analysis to generate the application fingerprint 106. The application fingerprint 106 may include identifiers for each of a set of identified code fragments 248 used by the application 103, identifiers for each of a set of identified device resources 251 used by the application 103, identifiers that are correlated to various patterns of resource consumption as indicated by the resource consumption profile 254, identifiers that are correlated to various patterns of user behavior as indicated by the behavior usage profile 257, and/or other data. If the application 103 has previously been added to the application marketplace 245, download popularity information 269 generated by the application marketplace system 224 may be available. A measure of download popularity may also be included in the application fingerprint 106.

In some cases, an application fingerprint 106 may inherit characteristics from other application fingerprints 106 that are generated for previous versions of the same application 103 or for similar applications 103. For example, a previous version of the application 103 may have an application fingerprint 106 that indicates that the mean duration of execution for the application 103 is five minutes. When a new version of the application 103 is released, insufficient behavioral usage metrics 239 may be available to determine the mean duration of execution. Thus, the application fingerprint 106 for the new version of the application 103 may inherit the previous mean duration of execution. As additional behavioral usage metrics 239 become available, the application fingerprint 106 may be regenerated.

As new versions of an application 103 are released, the corresponding application fingerprint 106 may be updated as well. In one embodiment, the application fingerprint generation service 215 is configured to detect when a new version of the application 103 is uploaded to the application marketplace system 224. In response to the new version being uploaded, the application fingerprint generation service 215 may be configured to regenerate the corresponding application fingerprint 106.

The application fingerprint 106 that has been generated may be used in many different ways. As an example, the application fingerprint 106 may be used in searching for applications 103 that have certain characteristics. To illustrate, suppose that a particular software library has been found to contain a significant defect. The identifier for the library could be obtained from the identified code fragments 248, and a fast search may be performed in the application fingerprints 106 to determine which application fingerprints 106 show a use of the particular software library.

Further, the application fingerprint 106 may be used to determine similarities among applications 103 based upon matching of application fingerprints 106. For example, clustering algorithms may be employed to determine groupings of applications 103, which may then result in categorization and assignment of categories 272 to applications 103. Also, a representative application 103 may be identified, and applications 103 that are similar may be determined using the respective application fingerprints 106. Likewise, this search may be employed as a basis of assigning a category 272 to an application 103.

To illustrate, a representative social networking application 103 may be selected, and the application fingerprints 106 may be searched to determine similar applications 103. For example, the similar applications 103 may have application fingerprints 106 that show long term execution in the clients 206, access requested for contact lists, access requested for sound and/or vibration devices, and/or other similar characteristics. The applications 103 that are determined may be assigned a category 272 of "social networking" in the application marketplace 245.

In some embodiments, the application 103 may be added, or not added, to the application marketplace 245 based at least in part on the application fingerprint 106. If the application fingerprint 106 shows use of a software library associated with malware, the application 103 may be flagged, restricted, or disallowed in the application marketplace 245. If the application fingerprint 106 shows high user interest based upon frequent user interactions documented in the behavioral usage profiles, the application 103 may be denoted as featured or otherwise given special emphasis in the application marketplace 245.

The lifestyle fingerprint generation service 216 may be configured to generate lifestyle fingerprints 116, each reflecting a profile of the behavior or lifestyle of a particular user. The lifestyle fingerprints 116 may be generated, for example, based at least in part on data gathered by the application marketplace system 224 (e.g., purchasing data) regarding particular users, behavioral usage metrics 239 associated with particular users, and other data. In some cases, the lifestyle fingerprints 116 may be generated based at least in part on the application fingerprints 106 generated for specific applications 103 that used by the users.

Figure 3:
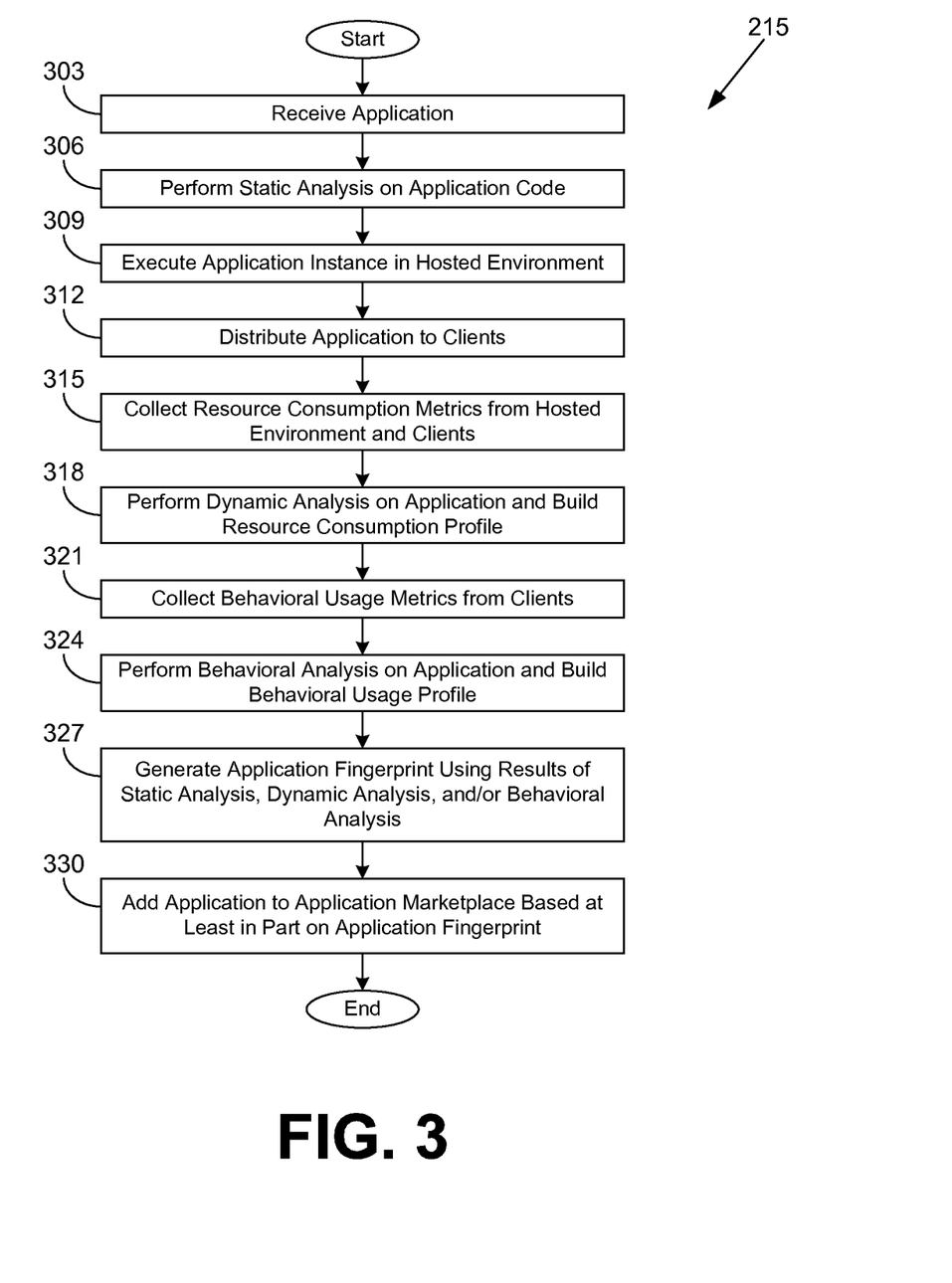
FIG. 3 is a flowchart illustrating one example of functionality implemented as portions of an application fingerprint generation service executed in a computing environment in the networked environment of FIG. 2 according to various embodiments of the present disclosure.

Referring next to FIG. 3, shown is a flowchart that provides one example of the operation of a portion of the application fingerprint generation service 215 according to various embodiments. It is understood that the flowchart of FIG. 3 provides merely an example of the many different types of functional arrangements that may be employed to implement the operation of the portion of the application fingerprint generation service 215 as described herein. As an alternative, the flowchart of FIG. 3 may be viewed as depicting an example of steps of a method implemented in the computing environment 203 (FIG. 2) according to one or more embodiments.

Beginning with box 303, the application fingerprint generation service 215 receives an application 103 (FIG. 1A). For example, the application 103 may be uploaded or downloaded from a developer to the computing environment 203. In box 306, the static analysis service 227 (FIG. 2) of the application fingerprint generation service 215 performs a static analysis on the application 103 using the object code 260 (FIG. 2), source code 263 (FIG. 2), and/or metadata 266 (FIG. 2). Through the static analysis, the static analysis service 227 determines identified code fragments 248 (FIG. 2) and/or identified hardware resources 251 (FIG. 2) that are used by the application 103.

In box 309, the application fingerprint generation service 215 executes an application instance 242 (FIG. 2) of the application 103 in a hosted environment 221 (FIG. 2). In box 312, the application fingerprint generation service 215 distributes the application 103 to clients 206 (FIG. 2). The application 103 may be distributed via the application marketplace system 224 (FIG. 2) or by another approach. The application 103 may then be executed as an application instance 242 on each of the clients 206. A metric generation service 275 (FIG. 2), which may be installed on the clients 206, may be employed to generate various metrics.

In box 315, the application fingerprint generation service 215 through the metric collection service 218 collects resource consumption metrics 236 (FIG. 2) from the hosted environment 221 and/or the clients 206. In box 318, the application fingerprint generation service 215 uses the dynamic analysis service 230 (FIG. 2) to perform a dynamic analysis on the application 103, which may involve generating a resource consumption profile 254 (FIG. 2) from the resource consumption metrics 236. In box 321, the application fingerprint generation service 215 collects behavioral usage metrics 239 (FIG. 2) from clients 206. In box 324, the behavioral analysis service 233 (FIG. 2) of the application fingerprint generation service 215 performs a behavioral analysis on the application 103 and builds a behavioral usage profile 257 (FIG. 2).

In box 327, the application fingerprint generation service 215 generates an application fingerprint 106 (FIG. 1A) using the results of the static analysis, dynamic analysis, and/or the behavioral analysis. The application fingerprint 106 may also include download popularity information 269 (FIG. 2) and/or other data, and the application fingerprint 106 may inherit data from other application fingerprints 106. In box 330, the application fingerprint generation service 215 adds the application 103 to the application marketplace 245 (FIG. 2) based at least in part on information included in the application fingerprint 106. Thereafter, the portion of the application fingerprint generation service 215 ends.

Figure 4A:
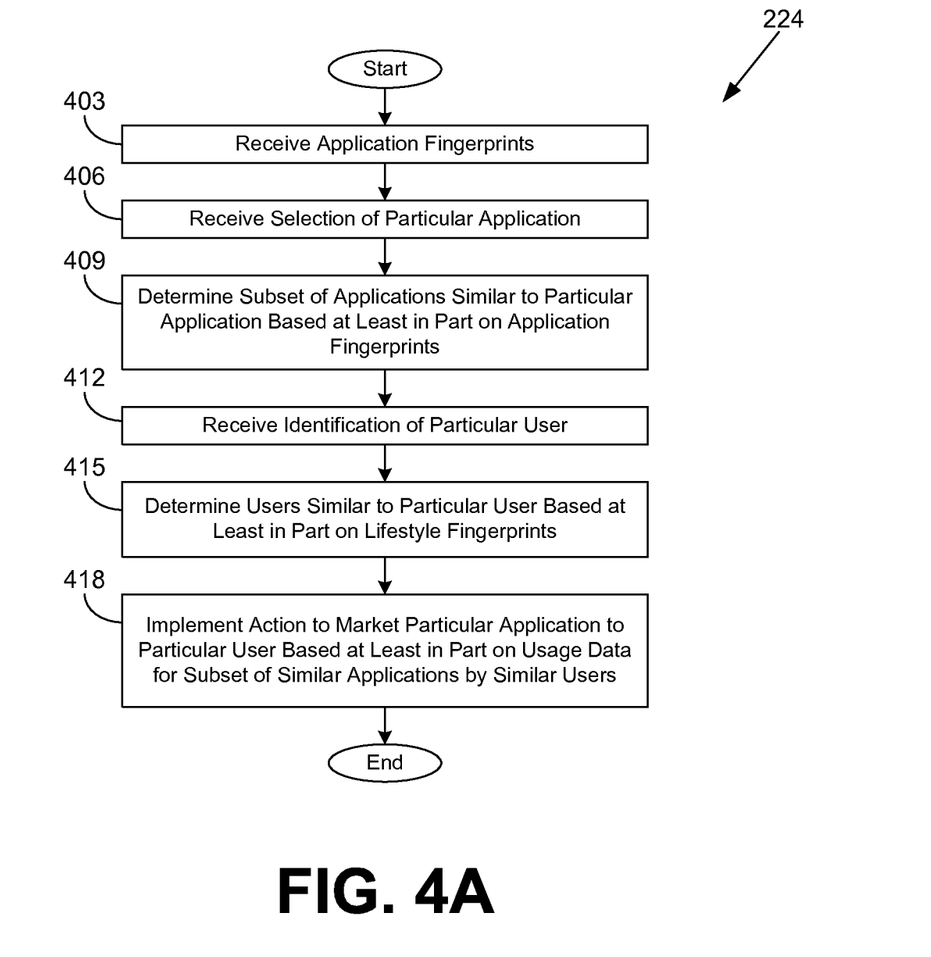
FIGS. 4A-4C are flowcharts illustrating examples of functionality implemented as portions of an application marketplace system executed in a computing environment in the networked environment of FIG. 2 according to various embodiments of the present disclosure.

Referring next to FIG. 4A, shown is a flowchart that provides one example of the operation of a portion of the application marketplace system 224 according to a first embodiment. It is understood that the flowchart of FIG. 4A provides merely an example of the many different types of functional arrangements that may be employed to implement the operation of the portion of the application marketplace system 224 as described herein. As an alternative, the flowchart of FIG. 4A may be viewed as depicting an example of steps of a method implemented in the computing environment 203 (FIG. 2) according to one or more embodiments.

Beginning with box 403, the application marketplace system 224 receives a plurality of application fingerprints 106 (FIG. 2), where each of the application fingerprints 106 is associated with a corresponding one of a plurality of applications 103 (FIG. 2). In box 406, the application marketplace system 224 receives a selection of a particular one of the applications 103. In box 409, the application marketplace system 224 determines a subset of the applications 103 that are similar to the particular application 103 based at least in part on the application fingerprints 106.

In box 412, the application marketplace system 224 receives an identification of a particular user. In box 415, the application marketplace system 224 determines users who are similar to the particular user based at least in part on lifestyle fingerprints 116 (FIG. 2). In box 418, the application marketplace system 224 implements an action to market the particular application 103 to the particular user based at least in part on lifestyle fingerprints 116 (FIG. 1) corresponding to usage data for the subset of the applications 103 that are similar to the particular application 103. The usage data may pertain to usage of the subset of the applications 103 by the similar users.

The action may take the form of a developer recommendation. The recommendation may, for example, include a recommended time trial period for the user, a recommended pricing model for the user, a recommended additional feature for the application 103, a recommended second application 103 to be marketed in conjunction with the application 103, and/or other recommendations. The recommendation may be sent to a developer or other party associated with the application 103.

In one embodiment, the recommendation may be implemented automatically by the application marketplace system 224 modifying a particular offering 273 of the application 103 to adjust a pricing model and/or other characteristics of the offering 273. In some cases, implementing the recommendation may involve configuring an application instance 242 (FIG. 2) already installed by a client 206 (FIG. 2). As a non-limiting example, a current time trial period may be extended for the user according to the recommendation.

Other actions may include informing developers of preferences of a target group of users, changing application versions, recommending upgrades, displaying certain information in an application marketplace 245 (FIG. 1) more or less readily, providing in-application items or application upgrades, adjusting pricing models, and so on. Thereafter, the portion of the application marketplace system 224 ends.

Figure 4B:
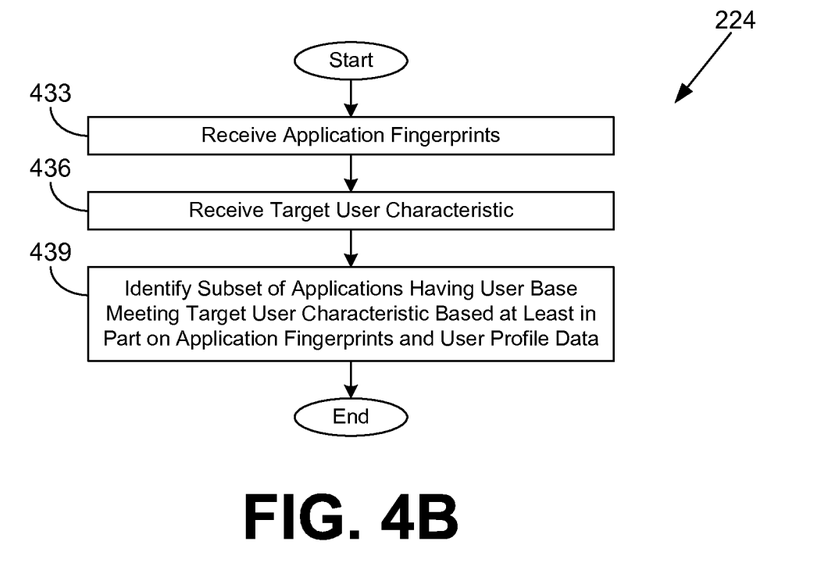

Moving on to FIG. 4B, shown is a flowchart that provides one example of the operation of a portion of the application marketplace system 224 according to a second embodiment. It is understood that the flowchart of FIG. 4B provides merely an example of the many different types of functional arrangements that may be employed to implement the operation of the portion of the application marketplace system 224 as described herein. As an alternative, the flowchart of FIG. 4B may be viewed as depicting an example of steps of a method implemented in the computing environment 203 (FIG. 2) according to one or more embodiments.

Beginning with box 433, the application marketplace system 224 receives application fingerprints 106 (FIG. 2) for a plurality of applications 103 (FIG. 2). In box 436, the application marketplace system 224 receives a target user characteristic. For example, the target user characteristic may be a user willingness to pay a threshold price for an application 103, a user willingness to initiate a purchase transaction during use of an application 103, and/or other characteristics. In one embodiment, the application marketplace system 224 receives an identification of a particular user and then determines the target user characteristic based at least in part on a characteristic associated with the particular user. In box 439, the application marketplace system 224 identifies a subset of the applications 103 having a user base that meets the target characteristic based at least in part on the application fingerprints 106 and user profile data indicating usage of the applications 103 by users and characteristics of those users.

To this end, an analysis of the application fingerprints 106 may be performed to determine whether a corresponding application 103 is predicted to have the desired user base. The subset of the applications 103 may be determined based at least in part on a similarity of the corresponding application fingerprints 106 to a particular application fingerprint 106 associated with a particular application 103. For example, the particular application 103 may use a certain identified code fragment 248 (FIG. 2) of type A. The application fingerprints 106 may be analyzed to determine other applications 103 that also use the identified code fragment 248 of type A, and those applications 103 may be considered similar. If the particular application 103 also uses an identified code fragment 248 of type B, and the other similar applications 103 also use the identified code fragment 248 of type B, such similar applications 103 may be classified as even more similar to the particular application 103.

The lifestyle fingerprints 116 for the users of the similar applications 103 may then be retrieved and correlated to determine the characteristics and preferences of the users. The application marketplace system 224 may provide a pricing model recommendation for the particular application based at least in part on a pricing model associated with the subset of the applications 103 and/or the preferences of the users. Thereafter, the portion of the application marketplace system 224 ends.

Figure 4C:
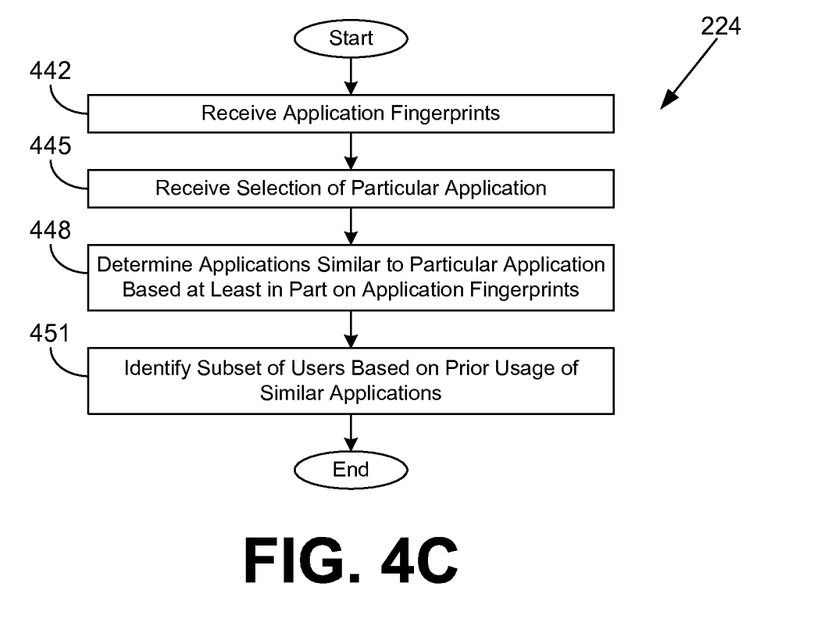

Continuing now to FIG. 4C, shown is a flowchart that provides one example of the operation of a portion of the application marketplace system 224 according to a third embodiment. It is understood that the flowchart of FIG. 4C provides merely an example of the many different types of functional arrangements that may be employed to implement the operation of the portion of the application marketplace system 224 as described herein. As an alternative, the flowchart of FIG. 4C may be viewed as depicting an example of steps of a method implemented in the computing environment 203 (FIG. 2) according to one or more embodiments.

Beginning with box 442, the application marketplace system 224 receives a plurality of application fingerprints 106 (FIG. 2), where each of the application fingerprints 106 is associated with a corresponding one of a plurality of applications 103 (FIG. 2). In box 445, the application marketplace system 224 receives a selection of a particular one of the applications 103. In box 448, the application marketplace system 224 determines a subset of the applications 103 that are similar to the particular application 103 by comparing a particular one of the application fingerprints 106 for the particular application 103 with others of the application fingerprints 106.

In box 451, the application marketplace system 224 identifies a subset of users based at least in part on data indicating prior usage of at least one of the subset of applications 103 by the subset of users. The subset of users may also be identified based at least in part on data indicating prior purchases of at least one of the subset of applications 103 by the subset of users, time of day of use or purchase, user demographic data, geographic usage data, device type, a characteristic associated with a developer of the particular application 103, and/or other factors.

From the subset of the users, the application marketplace system 224 may identify an underserved geography for the particular application 103 based at least in part on geographic data associated with the subset of users. For example, if many of the users who purchase the similar applications 103 are in a particular country, but not many of the users who purchase the particular application 103 are in that country, the country may be considered an underserved geography for the particular application 103. In one embodiment, the subset of the users may be leveraged for crowd-sourced testing of the particular application 103. Invitations may be sent to each of the subset of users inviting them to test the particular application 103. Thereafter, the portion of the application marketplace system 224 ends.

Figure 5:
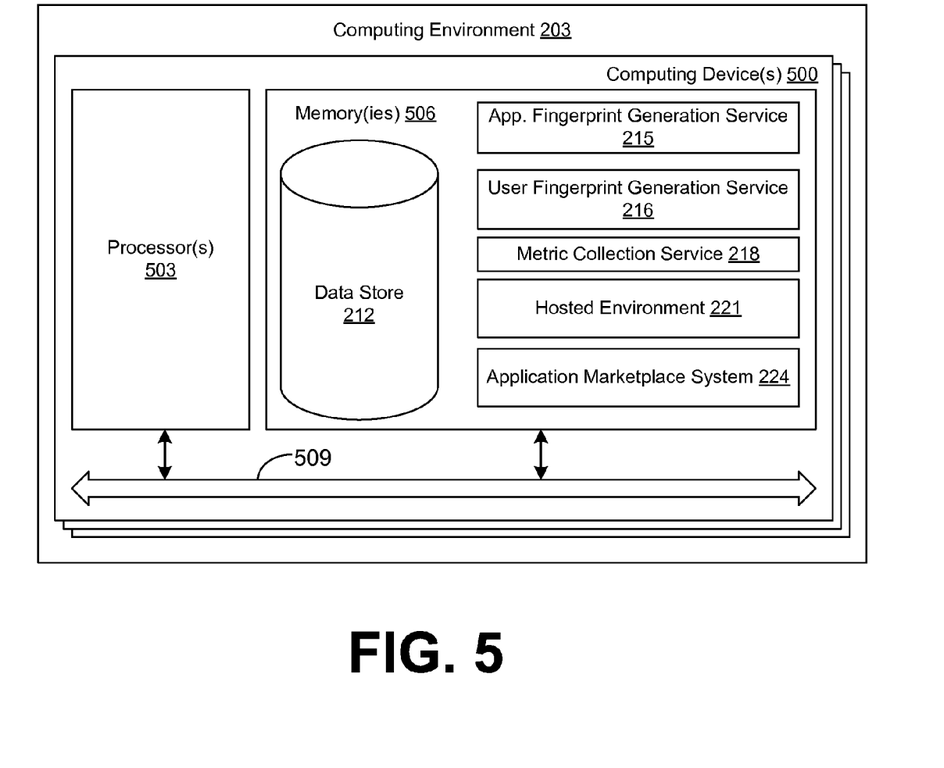
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the application fingerprint generation service 215, the lifestyle fingerprint generation service 216, the metric collection service 218, the hosted environment 221, the application marketplace system 224, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the application fingerprint generation service 215, the lifestyle fingerprint generation service 216, the metric collection service 218, the hosted environment 221, the application marketplace system 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-4C show the functionality and operation of an implementation of portions of the application fingerprint generation service 215 and the application marketplace system 224. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3-4C show a specific order of execution, it is understood that the order of execution may differ from that which is depicted. For example, the order of execution of two or more blocks may be scrambled relative to the order shown. Also, two or more blocks shown in succession in FIGS. 3-4C may be executed concurrently or with partial concurrence. Further, in some embodiments, one or more of the blocks shown in FIGS. 3-4C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application fingerprint generation service 215, the lifestyle fingerprint generation service 216, the metric collection service 218, the hosted environment 221, and the application marketplace system 224, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
receiving, via at least one computing device, a plurality of application fingerprints, individual ones of the plurality of application fingerprints being associated with a corresponding one of a plurality of applications, the individual ones of the plurality of application fingerprints being generated based at least in part on a static analysis, a dynamic analysis, and a behavioral analysis of the corresponding one of the applications;
receiving, via the at least one computing device, a selection of a particular one of the plurality of applications;
identifying, via the at least one computing device, a subset of the plurality of applications that are similar to the particular one of the plurality of applications based at least in part on the plurality of application fingerprints;
receiving, via the at least one computing device, an identification of a particular user;
determining, via the at least one computing device, a plurality of users who are similar to the particular user based at least in part on lifestyle fingerprint data for the plurality of users and the particular user; and
generating, via the at least one computing device, a recommendation of the particular one of the plurality of applications for the particular user based at least in part on usage data associated with usage of the subset of the plurality of applications by the plurality of users.

2. The method of claim 1, further comprising implementing, via the at least one computing device, the recommendation by sending a notification that promotes the particular one of the plurality of applications to the particular user.

3. A system, comprising:
at least one computing device; and
at least one service executable in the at least one computing device, the at least one service configured to at least:
determine an application fingerprint for individual ones of a plurality of applications, a respective application fingerprint being generated based at least in part on a static analysis, a dynamic analysis, and a behavioral analysis, and being indicative of one or more features of an application;
determine a lifestyle fingerprint for individual ones of a plurality of users, a respective lifestyle fingerprint being indicative of one or more preferences of a user; and
correlate the lifestyle fingerprint of the user with the application based at least in part on the application fingerprint.

4. The system of claim 3, wherein the lifestyle fingerprint is based at least in part on application usage data, application download data, purchase data, and a device profile.

5. The system of claim 3, wherein the application fingerprint indicates a set of code fragments employed by the application and a set of device resources employed by the application.

6. The system of claim 3, wherein the correlation is determined based at least in part on the application indicating one or more code fragments indicative of code that matches the one or more preferences of the user.

7. The system of claim 3, wherein the at least one service is further configured to at least recommend the application to the user.

8. The system of claim 3, wherein the at least one service is further configured to at least generate a pricing model recommendation for the application based at least in part on the lifestyle fingerprint and the application fingerprint.

9. The system of claim 3, wherein the at least one service is further configured to at least send data to a client computing device associated with the user, the data configured to include one or more of, an upgrade to the application, an advertisement, or an in-application item.

10. The system of claim 3, wherein the at least one service is further configured to at least send data to a developer, the data configured to include a recommended change to the application.

11. The system of claim 3, wherein the lifestyle fingerprint indicates a willingness of the user to initiate a purchase transaction during application use.

12. The system of claim 3, wherein the lifestyle fingerprint indicates whether the user has a preference for free application trials.

13. The system of claim 3, wherein the lifestyle fingerprint indicates whether the user is likely to purchase the application irrespective of price.

14. A method, comprising:
   receiving, by at least one computing device, a plurality of application fingerprints, individual ones of the plurality of application fingerprints being associated with corresponding ones of a plurality of applications, the individual ones of the plurality of application fingerprints being generated based at least in part on a static analysis, a dynamic analysis, and a behavioral analysis of the corresponding ones of the plurality of applications;
   receiving, by the at least one computing device, a selection of one of the plurality of applications;
   determining, by the at least one computing device, a subset of the plurality of applications that are similar to the one of the plurality of applications by comparing a particular one of the plurality of application fingerprints that is associated with the selected one of the plurality of applications with others of the plurality of application fingerprints;
   identifying, by the at least one computing device, a subset of a plurality of users based at least in part on lifestyle fingerprints of the subset of the plurality of users that indicate a preference for at least one application from the subset of the plurality of applications; and
   sending, by the at least one computing device, an invitation to test the selected one of the plurality of applications to individual ones of the subset of the plurality of users.

15. The method of claim 14, wherein the lifestyle fingerprints indicate prior usage of the at least one application from the subset of the plurality of applications by the subset of the plurality of users.

16. The method of claim 14, wherein the subset of the plurality of users are identified based at least in part on data indicating prior purchases of the at least one application from the subset of the plurality of applications by the subset of the plurality of users.

17. The method of claim 14, wherein the subset of the plurality of users are identified based at least in part on user demographic data.

18. The method of claim 14, wherein the subset of the plurality of users are identified based at least in part on a characteristic associated with a developer of the selected one of the plurality of applications.

19. The method of claim 14, wherein the dynamic analysis of an application of the plurality of applications comprises an analysis of resource consumption of a client computing device during execution of an instance of the application and a delivery of a report on the resource consumption by the instance of the application.

20. The method of claim 19, wherein the behavioral analysis of an application of the plurality of applications comprises an analysis of usage of an instance of the application, wherein the analysis considers at least one of a location of the client computing device during execution of the instance of the application, a duration of use for the instance of the application, and a time of day that the instance of the application is executed.

\* \* \* \* \*